United States Patent

Kono

[11] 3,980,054
[45] Sept. 14, 1976

[54] STRATIFIED COMBUSTION ROTARY PISTON ENGINE WITH A FUEL INJECTION SYSTEM

[75] Inventor: Toshiyuki Kono, Toyoake, Japan

[73] Assignee: Toyota Jidosha Kogyo Kabushiki Kaisha, Toyota, Japan

[22] Filed: Sept. 25, 1975

[21] Appl. No.: 616,650

[30] Foreign Application Priority Data
June 19, 1975 Japan.............................. 50-74641

[52] U.S. Cl. ............................................. 123/8.13
[51] Int. Cl.² ......................................... F02B 53/04
[58] Field of Search................ 123/8.13, 8.09, 8.05, 123/8.45, 119 DB, 123

[56] References Cited
UNITED STATES PATENTS

| | | | |
|---|---|---|---|
| 3,491,729 | 1/1970 | Lamm | 123/8.13 |
| 3,780,707 | 12/1973 | Cole | 123/8.13 |
| 3,868,929 | 3/1975 | Ishikawa | 123/8.13 X |
| 3,885,003 | 5/1975 | Kobayashi | 123/8.13 X |
| 3,893,429 | 7/1975 | Jones | 123/8.13 |
| 3,906,906 | 9/1975 | Arai | 123/8.13 |
| 3,915,126 | 10/1975 | Kishimoto | 123/8.13 |

Primary Examiner—Clarence R. Gordon
Attorney, Agent, or Firm—Birch, Stewart, Kolasch & Birch

[57] ABSTRACT

A stratified combustion rotary piston engine of the type which is supplied with a fuel-air mixture from a peripheral intake port and only air from a side intake port, wherein a fuel supply system for supplying said fuel-air mixture to said peripheral intake port comprises a fuel injection device which is controlled depending upon the air flow to said peripheral intake port and said side intake port.

4 Claims, 2 Drawing Figures

STRATIFIED COMBUSTION ROTARY PISTON ENGINE WITH A FUEL INJECTION SYSTEM

BACKGROUND OF THE INVENTION

1. Field of the Invention

The present invention relates to a rotary piston engine, and more particularly, a fuel supply system for the stratified combustion rotary piston engine of the type described in Japanese Pat. application No. 71426/74 filed on June 24, 1974 by the same assignee as the present invention.

2. Description of the Prior Art

In the so-called Wankel-type rotary piston engine which comprises a casing composed of a rotor housing having a trochoidal inner peripheral surface and side housings which close opposite sides of said rotor housing and a polygonal rotor adapted to rotate eccentrically in said casing with its apex portions sliding over said inner peripheral surface, the flame initiated from an ignition plug propagates very swiftly toward the leading side located at the rotational front side of the rotor due to the flow of the fuel-air mixture caused by the rotation of the rotor, however, the propagation of the flame toward the trailing side located at the rotational rear side of the rotor is difficult to achieve. Thus, there is a problem in that the fuel-air mixture is favourably combusted in the leading side whereas the combustion is incomplete in the trailing side which lowers the combustion efficiency with an increase in the fuel consumption while simultaneously increasing harmful uncombusted components such as HC and CO emitted in the exhaust gas. In order to solve this problem, the aforementioned Japanese Pat. application No. 71426/74 proposes to provide the rotary piston engine with a first intake port which opens in said trochoidal inner peripheral surface and a second intake port which opens in an inner surface of said side housing at a portion advanced from said first intake port with respect to the rotational direction of the rotor. A fuel-air mixture is supplied to said first intake port and only air is supplied to said second intake port, thereby accomplishing stratified charging such that the leading side portion of the combustion chamber where the combustion of the fuel-air mixture is relatively easily effected, is filled with a relatively rich fuel-air mixture, while the trailing side of the chamber where the combustion of the mixture is difficult to achieve is filled with only air. For use with this particular rotary piston engine, in order to supply a fuel-air mixture to said first intake port and only air to said second intake port, Japanese Pat. application No. 78721/74 filed on July 11, 1974 by the same assignee as the present invention has proposed a particular two-barrel type carburetor which comprises a first supply system including a Venturi, a main nozzle, a main jet, a float chamber, etc. and being adapted to supply a fuel-air mixture and a second supply system adapted to supply only air, said first and second supply systems further including first and second throttle valves respectively incorporated therein and interconnected with each other by a linkage mechanism.

However, it is relatively difficult to maintain the optimum air/fuel ratio throughout the entire operational region of the engine when the fuel-air mixture is generated by a carburetor such as the abovementioned type. In the abovementioned stratified combustion rotary piston engine, the overall air/fuel ratio is determined by the amount of fuel supplied through said first intake port (peripheral intake port) (Peri fuel) and the amount of air supplied through said first intake port (Peri air), the fuel and air being supplied as a fuel-air mixture, and the amount of air supplied through said second port (side port) (Side air) according to the following formula:

$$\text{Overall air/fuel ratio:} = \frac{\text{Side air} + \text{Peri air}}{\text{Peri fuel}}$$

$$= \frac{(\alpha + 1) \text{Peri air}}{\text{Peri fuel}}$$

$$= (\alpha + 1) \beta \quad (1)$$

$$\text{wherein } \alpha = \frac{\text{Side air}}{\text{Peri air}} \quad (2)$$

$$\beta = \frac{\text{Peri air}}{\text{Peri fuel}} \quad (3)$$

Therefore, in addition to a substantial difficulty in controlling the air/fuel ratio at a desired value over the entire operational region in a conventional rotary piston engine, the present stratified combustion rotary piston engine further requires to control $\alpha$ in relation to $\beta$ thereby making it very difficult to maintain the overall air-fuel ratio at the optimum value throughout the entire operational region of the engine, if the fuel supply system depends upon the conventional carburetor system.

SUMMARY OF THE INVENTION

Therefore, it is the object of the present invention to solve the abovementioned difficulty and to provide an improved stratified combustion rotary piston engine which is able to operate at the optimum air/fuel ratio over the entire operational region thereof.

According to the present invention, the abovementioned object is accomplished by a rotary piston engine comprising a casing composed of a rotor housing having a trochoidal inner peripheral surface and side housings which close opposite sides of said rotor housing and a polygonal rotor adapted to rotate eccentrically in said casing with apex portions thereof sliding over said inner peripheral surface. The casing has a first intake port which opens in said trochoidal inner peripheral surface and a second intake port which opens in an inner surface of said side housing at a position advanced from said first intake port with respect to the rotational direction of said rotor, said first intake port being supplied with a fuel-air mixture while said second intake port is supplied with only air. According to the present invention, a fuel-injection device is provided in the fuel supply system for supplying a fuel-air mixture to said first intake port, said fuel-injection device being controlled to inject fuel in relation to the amount of air supplied through said first and second intake ports.

By utilizing a fuel supply system employing a fuel-injection device, the amount of fuel which is supplied can not only be more precisely controlled when compared with the conventional Venturi type carburetor but also can be optionally related to the amount of air supply through said first and second intake ports according to the operational condition of the engine. Furthermore, since the injection or stoppage of fuel is optionally effected in relation to the phase of rotation of the rotor when the fuel is supplied by a fuel injection device, the stratifying manner in the stratified combustion can be controlled to obtain a optimum engine operation.

BRIEF DESCRIPTION OF THE DRAWINGS

In the accompanying drawing.

DESCRIPTION OF THE PREFERRED EMBODIMENT

Figure 1:
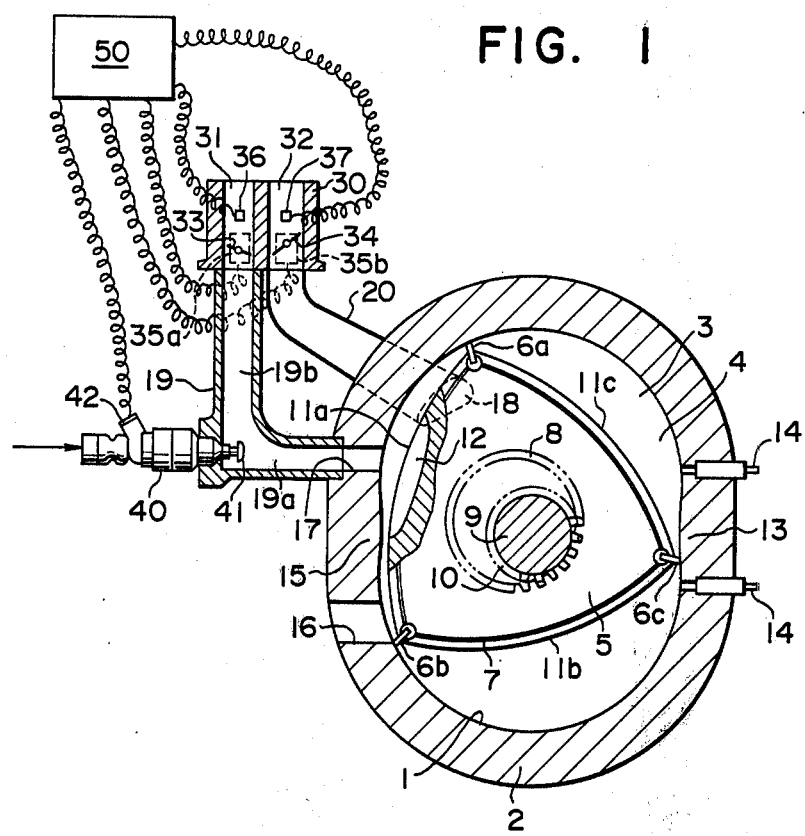
FIG. 1 is a schematic sectional view of a rotary piston engine according to the present invention; and, FIG. 2 is a diagram showing the opening area and timing of the peripheral and side ports in the engine shown in FIG. 1.

Referring to FIG. 1 showing a rotary piston engine which has the same basic constitution as the engine described in Japanese Pat. application No. 71426/74, a rotor housing 2 having a trochoidal inner peripheral surface 1 is assembled with side housings 4 each having a flat inner surface 3 to provide a casing in which a triangular rotor 5 is disposed. The rotor is mounted to be rotatable eccentrically with its apex seals 6a–6c provided at its three apex portions sliding over the trochoidal inner peripheral surface 1 while simultaneously contacting the inner surface 3 of the side housing and with its side seals 7 provided along its three edges. The rotor is adapted to effect its eccentric rotation by the meshing of internal gear 8 with a fixed gear 10 of an eccentric shaft 9. At a central portion of three arcuate contour surfaces 11a–11c of the rotor 5, recesses 12 (only one is shown) are respectively provided. Adjacent a short axis portion 13 of the trochoidal inner peripheral surface 11 of the rotor housing 2, two spark plugs 14 are provided and, adjacent another short axis portion 15, there are provided an exhaust port 16 as located rearward with respect to the rotational direction of the rotor and a peripheral intake port 17 located forward with respect to the rotational direction of the rotor. Further advanced from the intake peripheral port 17 in the rotational direction of the rotor, a side port 18 is provided to open in the inner surface 3 of the side housing 4. The opening area of the peripheral intake port 17 is maintained at a relatively small constant value in a region extending before and after the top dead center (T.D.C.) as shown by curve $a$ in FIG. 2. By contrast, the opening area of the side port 18 changes as shown by curve $b$ in FIG. 2. i.e., by increasing steeply after the rotational angle of the eccentric shaft 9 has traversed the T.D.C. until it becomes several times larger than the peripheral port opening, and then rapidly decreasing.

The ports 17 and 18 are connected to a throttle body 30 through intake manifolds 19 and 20, respectively. The throttle body 30 is constituted as a two-barrel type throttle body comprising a first air supply passage 31 for supplying air to the peripheral intake port 17 and a second air supply passage 32 for supplying air to the side port 18. The air supply passages 31 and 32 which are connected with the intake manifolds 19 and 20 respectively, are provided with throttle valves 33 and 34, respectively, for controlling air flow therethrough. The throttle valves 33 and 34 are actuated by individual actuating mechanisms 35a and 35b diagrammatically illustrated by blocks in broken lines. The actuating mechanisms 35a and 35b may be any conventional link mechanism or electrical mechanism employing a reversible motor, which is adapted to establish a predetermined opening for each throttle valve according to a control signal despatched from a computer as described hereinunder. The intake manifold 19 which supplies air to the peripheral intake port 17 is formed in an L-shape, having a horizontal portion 19a connected to the port 17 and a vertical portion 19b connected to the air supply passage 31. A fuel injection device 40 is provided in the bottom portion of the vertical passage portion 19b so that an injection port 41 faces the horizontal passage portion 19a for injecting fuel thereinto in an amount corresponding to the amount of air passing through the intake manifold 19. The fuel ejected from the injection port 41 into the horizontal passage portion 19a is mixed with air in the passage portion to form a fuel-air mixture having a determined air/fuel ratio ($\beta$) throughout the entire operational region of the engine, said mixture being supplied through the peripheral port 19 to the combustion chambers defined in the rotor housing 2. The air/fuel ratio ($\beta$) is determined to be lower than the normal theoretical ratio.

Figure 2:
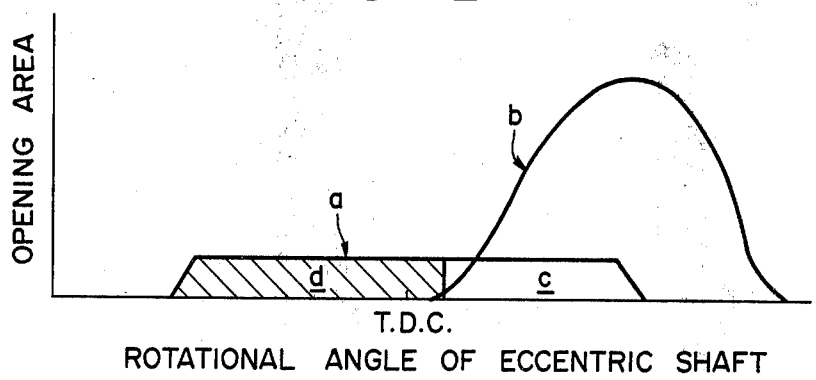

In order to properly maintain the air/fuel ratio over the operational region of the engine, air flow sensors 36 and 37 are provided in the air flow passages 31 and 32, respectively, said sensors being adapted to provide electric signals concerning the air flow in said passages to an electronic computer 50. In this case, the computer 50 despatches a signal to a fuel flow control valve 42 of the fuel injection device 40 according to the air flow detected by the air flow sensor 36 provided in the air supply passage 31 for the peripheral port 17 so as to maintain the air/fuel ratio ($\beta$) at a proper value as determined by the aforementioned formula (3). On the other hand, the information regarding the air flow in the air flow passages 31 and 32 obtained by the sensors 36 and 37 is processed in the computer 50 to produce control signals for the actuating mechanisms 35a and 35b for the throttle valves 33 and 34 so that the throttle valves are individually adjusted to effect a determined air flow for the ports 17 and 18 in a manner to maintain a determined value of $\alpha$ in the aforementioned formula (2). Since in this manner $\alpha$ and $\beta$ are individually and positively controlled, the overall air/fuel ratio can be maintained at an optimum value throughout the entire operational region of the engine. The rotary piston engine which is supplied with fuel by a fuel injection device according to the present invention has another advantage as compared with one which is to be operated with the conventional carburetor. Referring to FIG. 2, as previously explained the curves $a$ and $b$ show the manner in which the peripheral port 17 and the side port 18 are opened in relation to the rotational angle of the eccentric shaft. From this figure, it will be noted that since there is an overlap in opening of the peripheral port 17 and the side port 18, the supply of fuel-air mixture still continues after the side port 18 has started to open in the case where the conventional carburetor is employed, thereby effecting parallel supply of fuel-air mixture from the peripheral port 17 and from the side port 18 in the region shown by $c$ in FIG. 2. This parallel supply is not favorable in view of the stratified combustion. In the fuel injection system according to the present invention, timing for the fuel supply is optionally controlled in relation to the rotational phase of the rotor by properly controlling the on-off operation of the fuel control valve 42 by the computer 50 and, therefore, it is easy to stop the fuel supply at that point in time when the side port 18 begins to open so that thereafter, only air is supplied from the peripheral port 17.

In this case, therefore, fuel or fuel-air mixture is supplied from the peripheral port 17 only in the hatched region *d* in FIG. 2 and, thereafter, the combustion chamber is supplied with only air from the peripheral port 17 and the side port 18. As a result, the stratification of combustion is made more distinct as compared with the case employing the conventional carburetor, thereby effecting a more improved combustion which accomplishes further improvement in the fuel consumption and exhaust gas purification.

I claim:

1. A rotary piston engine comprising a casing composed of a rotor housing having a trochoidal inner peripheral surface and side housings which close opposite sides of said rotor housing and a polygonal rotor mounted to rotate eccentrically in said casing with apex portions thereof sliding over said inner peripheral surface, said casing having a first intake port which opens in said trochoidal inner peripheral surface and a second intake port which opens in an inner surface of said side housing at a portion advanced from said first intake port with respect to the rotational direction of said rotor, said first intake port being supplied with a fuel-air mixture while said second intake port is supplied with only air, wherein the improvement comprises a fuel injection device provided in a fuel supply system for supplying a fuel-air mixture to said first intake port, said fuel injection device being provided with means for controlling the injection of fuel in relation to the amount of air supplied through said first and second intake ports.

2. The rotary piston engine of claim 1, wherein said fuel injection device is controlled to inject fuel only in the period in which only said first intake port is opened.

3. The rotary piston engine of claim 1, wherein an air supply system is provided for supplying air to said second intake port, said fuel supply system for supplying the fuel-air mixture to said first intake port and the air supply system for supplying air to said second intake port being provided with first and second throttle valves and first and second air flow sensors, respectively, and computer means for controlling said first and second throttle valves and said fuel injection device, based upon information received from said first and second air flow sensors with respect to the air flow in said fuel supply system and said air supply system.

4. The rotary piston engine of claim 1, wherein said fuel supply system comprises an L-shaped intake manifold having a vertical passage portion and a horizontal passage portion, the latter passage portion being connected to said first intake port, said fuel injection device being provided in a bottom end portion of said vertical passage portion in a manner to have an injection port thereof face through said horizontal passage portion.

* * * * *